United States Patent
Aoyama

(10) Patent No.: US 8,953,055 B2
(45) Date of Patent: Feb. 10, 2015

(54) IMAGE PICKUP APPARATUS

(75) Inventor: Satoshi Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 13/595,489

(22) Filed: Aug. 27, 2012

(65) Prior Publication Data

US 2013/0057719 A1 Mar. 7, 2013

(30) Foreign Application Priority Data

Sep. 5, 2011 (JP) .................. 2011-192814

(51) Int. Cl.
*H04N 5/225* (2006.01)
*H04N 5/228* (2006.01)
*H04N 5/77* (2006.01)
*H04N 5/926* (2006.01)

(52) U.S. Cl.
CPC .............. *H04N 5/228* (2013.01); *H04N 5/772* (2013.01); *H04N 5/926* (2013.01)
USPC ..................................... 348/220.1

(58) Field of Classification Search
USPC .......................... 348/220.1–221.1
See application file for complete search history.

(56) References Cited

U.S. PATENT DOCUMENTS

2006/0256203 A1* 11/2006 Honma ...................... 348/220.1
2008/0273094 A1* 11/2008 Kunieda .................... 348/220.1
2010/0067880 A1* 3/2010 Ikeda ........................... 386/109

FOREIGN PATENT DOCUMENTS

JP  2001-111934 A  4/2001

* cited by examiner

*Primary Examiner* — Timothy J Henn
(74) *Attorney, Agent, or Firm* — Canon U.S.A., Inc. IP Division

(57) ABSTRACT

In response to an input of an instruction of still image capturing when a moving image is being captured, an image pickup apparatus compresses predetermined image data as an IDR frame of a moving image more than once, and uses a plurality of acquired IDR frames more than once to record the IDR frames onto a recording medium as moving image data in such an order that the IDRIDs of the adjacent IDR frames are not identical.

19 Claims, 7 Drawing Sheets

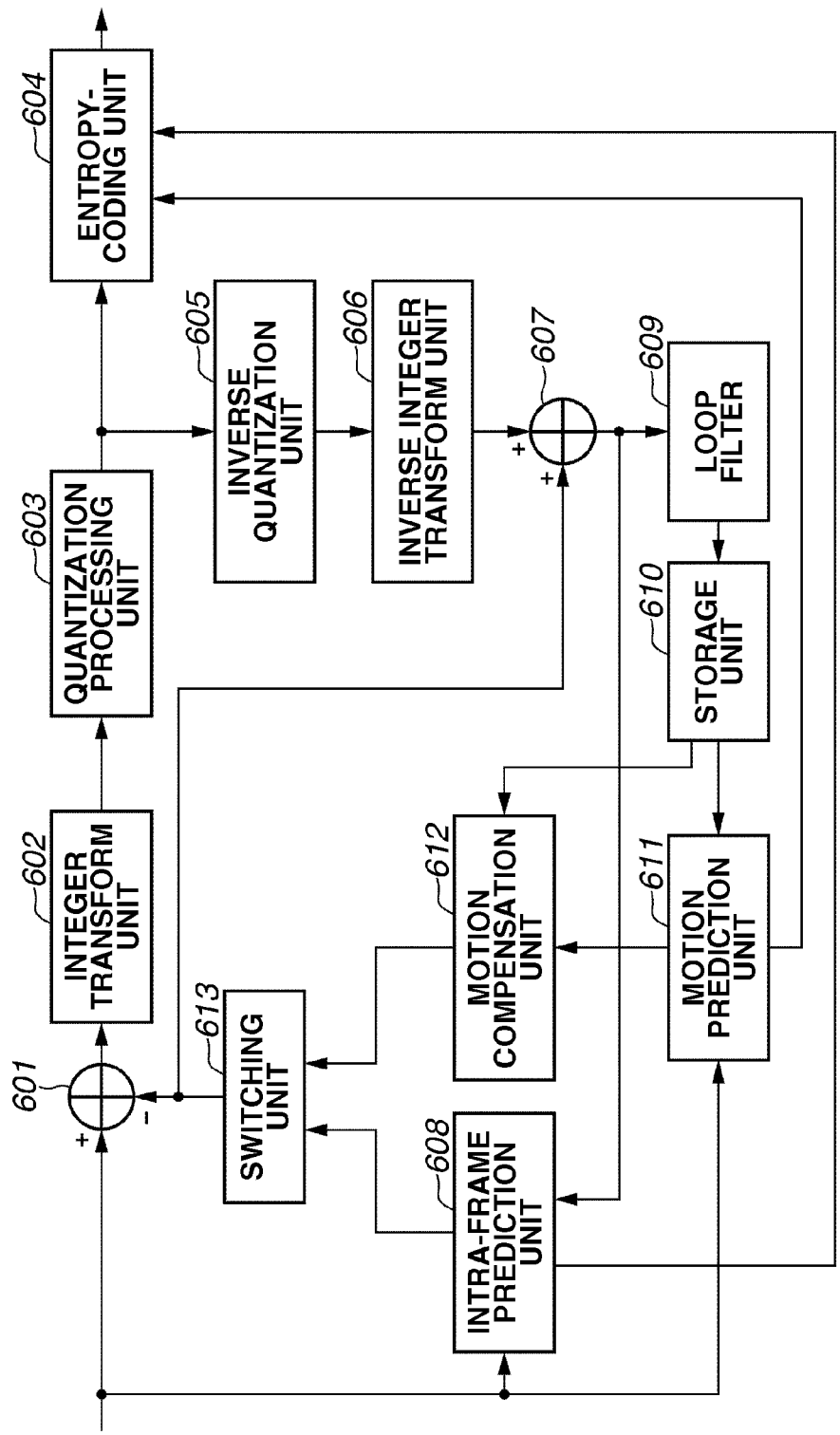

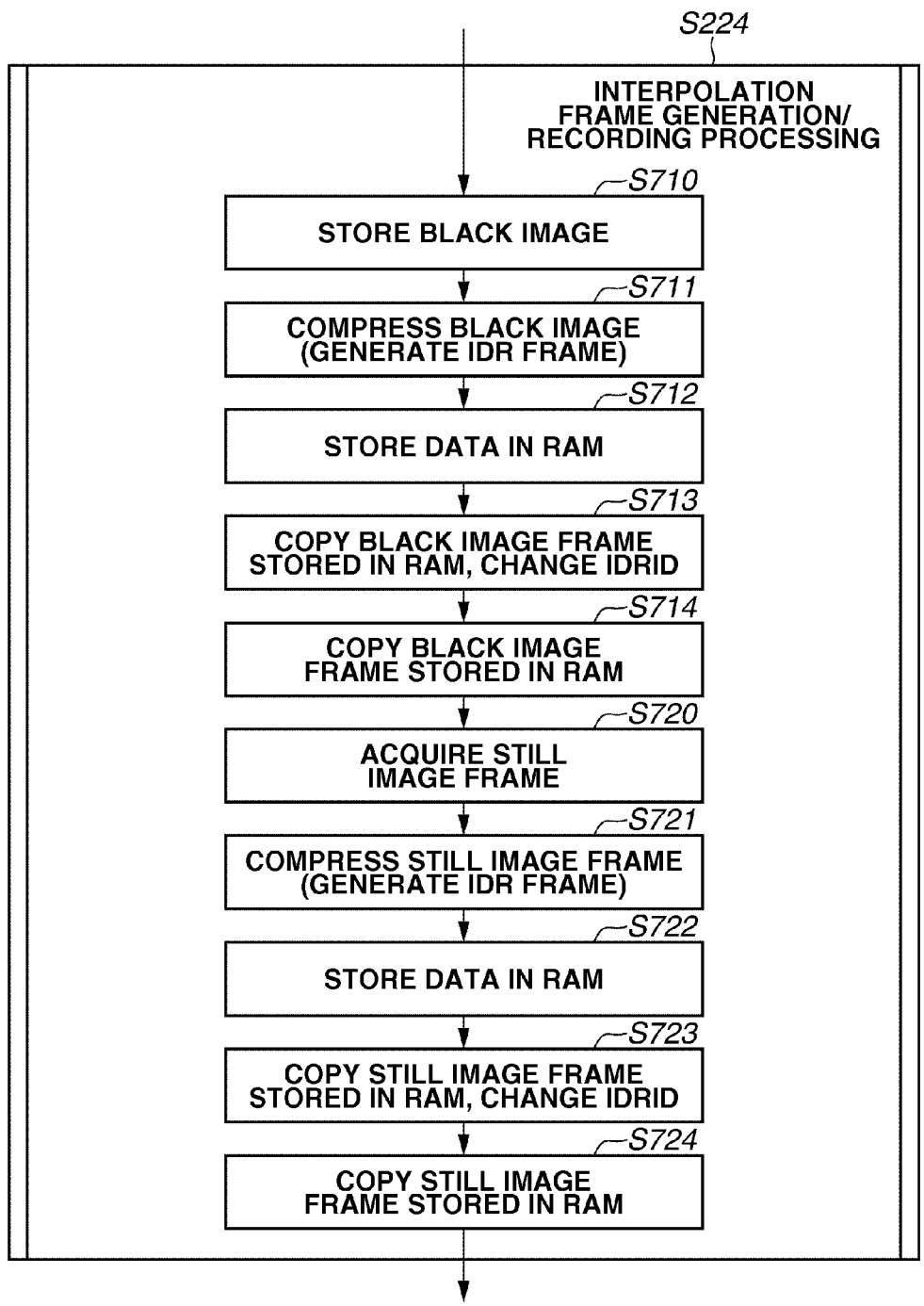

IMAGE PICKUP APPARATUS

BACKGROUND OF THE INVENTION

1. Field of the Invention

The present invention relates to an image pickup apparatus.

2. Description of the Related Art

In these days, there is provided an image pickup apparatus capable of capturing a still image while a moving image is being captured.

However, various capturing parameters such as time of exposure, resolution, ISO sensitivity, white balance adjustment, gamma correction are different between the moving image capturing and the still image capturing. Accordingly, at present, in order to capture the still image while the moving image is being captured, such processing is performed that the moving image capturing (recording of moving image frames) is suspended until the still image capturing is completed, and is restarted after completion of the still image capturing.

Therefore, Japanese Patent Application Laid-Open No. 2001-111934 discusses a technique of interpolating a plurality of moving image frames for the period that is suspended due to still image capturing. In the technique, the plurality of moving image frames are interpolated with interpolation frames generated from still image data acquired from the still image capturing and a preceding and a succeeding frames of the moving image frames that are lost due to the still image capturing. Further, there is provided a known image pickup apparatus capable of interpolating a plurality of moving image frames for the period suspended due to still image capturing with interpolation frames generated from black image data.

On the other hand, in recent years, as a compression coding standard of a moving image, increasing attention has been given to the Moving Picture Experts Group Phase 4 Advanced Visual Communication H.264 (MPEG-4 AVC/H.264). MPEG-4 AVC/H.264 realizes a compression rate higher than that in the past compression method such as the Moving Picture Experts Group 2 (MPEG-2), and has been employed as a compression method for the moving image data of image pickup apparatuses. Particularly, in MPEG-4 AVC/H.264, an instantaneous decoding refresh (IDR) frame is newly defined.

The IDR frame is an intra-frame (I-frame) encoded based only on intra-frame information. In MPEG-4 AVC/H.264, a predicted frame (P-frame) and a bi-directional predicted frame (B-frame) generated by encoding succeeding interframes of the IDR frame, are not allowed to refer to the preceding frame of the IDR frame.

Further, in MPEG-4 AVC/H.264, an IDR frame identifier (idr_pic_id) is assigned to each of the IDR frames, and it is defined that different IDR frame identifiers (idr_pic_id) should be assigned to the IDR frames that are adjacent to each other (ISO/IEC14496-10).

As discussed in Japanese Patent Application Laid-Open No. 2001-111934, in a case where the moving image frames corresponding to the period of still image capturing are interpolated with interpolation frames generated from still image data and predetermined interpolation frames, the interpolation is performed by inserting the same frame into the moving image frames more than once.

However, as a compression method for moving image data, for example, as in the case of MPEG-4 AVC/H.264, a compression method with a limiting condition such as "different IDR frame identifiers (idr_pic_id) should be assigned to the IDR frames adjacent to each other" is employed. In this case, employing such an interpolation method causes a problem in that the same IDR frame identifier (idr_pic_id) may be assigned to the IDR frames adjacent to each other in an interpolation frame section.

SUMMARY OF THE INVENTION

The present invention is directed to an image pickup apparatus employing a compression method with a limiting condition such as "different IDR frame identifiers (idr_pic_id) should be assigned to the IDR frames adjacent to each other". This image pickup apparatus is capable of generating moving image data that can satisfy the limiting condition even in a case where a still image is captured while a moving image is being captured.

According to an aspect of the present invention, an image pickup apparatus includes: an image capture unit that captures an image; a compression unit that sequentially compresses the image captured by the image capture unit as moving image data; a recording unit that records the moving image data compressed by the compression unit onto a recording medium; and a control unit that controls the compression unit and the recording unit. In the image pickup apparatus, in response to an input of an instruction for capturing a still image while the moving image is being captured, the control unit controls the compression unit to compress predetermined image data as an IDR frame of the moving data more than once, and controls the recording unit to record a plurality of IDR frames acquired by compressing the moving data more than once, so that identifiers of the adjacent IDR frames are not identical.

According to the aspect of the present invention, in using a compression method with the limiting condition such as "different IDR frame identifiers (idr_pic_id) should be assigned to the IDR frames adjacent to each other", it is possible to generate moving image data which can satisfy the limiting condition even when the still image is captured while the moving image is being captured.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a block diagram illustrating a configuration of a coding/decoding processing unit according to the exemplary embodiment of the present invention.

FIG. 7 is a flowchart illustrating interpolation frame generation/recording processing performed during the moving image capturing mode.

DESCRIPTION OF THE EMBODIMENTS

Figure 1:
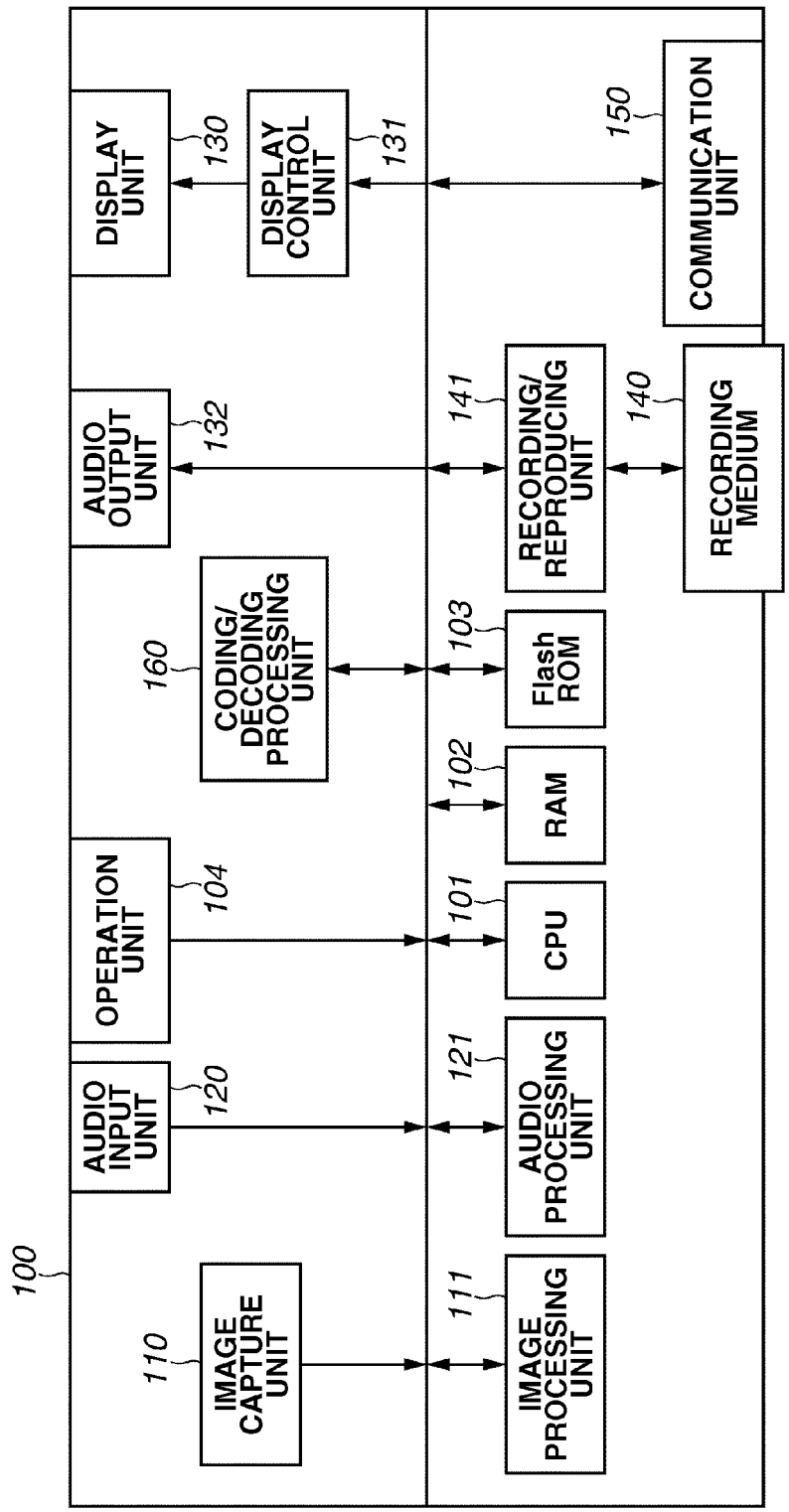
FIG. 1 is a block diagram illustrating a configuration of an image pickup apparatus according to an exemplary embodiment of the present invention.

Various exemplary embodiments, features, and aspects of the invention will be described in detail below with reference to the drawings.

Herein, description is given to an image pickup apparatus according to an exemplary embodiment capable of capturing a still image while a moving image is being captured.

The image pickup apparatus according to the present exemplary embodiment which employs MPEG-4 AVC/H.264 as a compression method for moving image data is exemplified. However, the above-mentioned exemplary embodiment is merely an example of the present exemplary embodiment, and any compression method can be employed as long as the compression method includes the limiting condition such as "different IDR frame identifiers (idr_pic_id) should be assigned to the IDR frames adjacent to each other". In other words, the compression method is not limited to MPEG-4 AVC/H.264.

The IDR frame is an intra-frame (I-frame) encoded by an intra-frame coding method in which coding is carried out based only on intra-frame information. In MPEG-4 AVC/H.264, a P-frame and a B-frame generated by encoding succeeding inter-frames of the IDR frame, are not allowed to refer to the preceding frame of that IDR frame.

Further, in MPEG-4 AVC/H. 264, an IDR frame identifier (idr_pic_id) is assigned to each of the IDR frames, and it is defined that different IDR frame identifiers (idr_pic_id) should be assigned to the IDR frames that are adjacent to each other (refer to ISO/IEC14496-10).

Incidentally, still image data which is compressed by the Joint Photographic Experts Group (JPEG) method is described as an example. However, this is merely an example, and any compression method for the still image data can be employed, or the still image data may not necessarily be compressed.

Further, the moving image data and the still image data recorded onto a recording medium formatted through file systems such as the File Allocation Table (FAT) and the Extended File Allocation Table (exFAT) and managed as files are described as an example. However, this is merely an example, and any file systems other than the above-mentioned file systems may be employed as well.

One distinctive configuration of the image pickup apparatus according to the present exemplary embodiment is as follows. In an image pickup apparatus 100 according to the present exemplary embodiment, moving image frames that are lost due to the still image capturing performed when the moving image is being captured during a moving image capturing mode can be interpolated with interpolation frames.

When the interpolation frames are generated, a coding/decoding processing unit generates encoded image data each having a different IDR frame identifier (idr_pic_id) by causing a plurality of images (two or more images) for the interpolation frames to be encoded as the IDR frames. Thereafter, the generated encoded image data each having a different IDR frame identifier (idr_pic_id) is interpolated to each frame of the moving image data in the order in which the IDR frame identifier (idr_pic_id) adjacent to each other is not the same (i.e., the order in which the IDR frame identifiers (idr_pic_id) adjacent to each other become different), and is recorded onto a recording medium.

In the image pickup apparatus according to the present exemplary embodiment, the above-described configuration enables different IDR frame identifiers (idr_pic_id) to be assigned to the IDR frames adjacent to each other when the moving image frames that are lost due to the still image capturing are interpolated with the interpolation frames. The above-described image pickup apparatus is further described below.

FIG. 1 is a block diagram illustrating a configuration of the image pickup apparatus 100 according to the present exemplary embodiment. The image pickup apparatus 100 includes a central processing unit (CPU) 101, a random access memory (RAM) 102, a Flash read only memory (Flash ROM) 103, and an operation unit 104. The image pickup apparatus 100 further includes an image capture unit 110, an image processing unit 111, an audio input unit 120, an audio processing unit 121, a display unit 130, a display control unit 131, an audio output unit 132, a recording medium 140, a recording/reproducing unit 141, and a communication unit 150. Furthermore, the image pickup apparatus 100 includes a coding/decoding processing unit 160.

As illustrated in FIG. 1, the CPU 101 loads a control program of the image pickup apparatus 100 stored in the Flash ROM 103 onto the RAM 102, uses the RAM 102 as a work memory, and controls each block of the image pickup apparatus 100. The operation unit 104 includes switches such as a power button, a recording button, a zoom adjustment button, an auto-focus button for inputting various kinds of operations relating to image capturing.

The operation unit 104 further includes a menu display button, a determination button, a cursor key, a pointing device, a touch panel. The operation unit 104 transmits an operation signal to the CPU 101 when a user operates these keys, buttons, and the touch panel.

When an optical image of an object is input through a lens, the image capture unit 110 controls an amount of light of the optical image by a diaphragm, converts the optical image into an analog image signal by an imaging element such as a charge coupled device image (CCD) sensor and a complementary metal oxide semiconductor image (CMOS) sensor, and further converts the acquired analog image signal into a digital image signal, and temporarily stores the digital image signal in the RAM 102.

Thereafter, the digital image signal stored in the RAM 102 is transmitted to the image processing unit 111. The image processing unit 111 is a microcomputer in which a program for executing the following processing is installed. The image processing unit 111 performs image quality adjustment processing for adjusting white balance, color, and brightness of the digital image signal according to a setting value set by a user, or a setting value automatically determined based on the characteristics of the image, and stores the processed digital image signal in the RAM 102 again.

Incidentally, the CPU 101 may load a program to perform the above-mentioned processing, which is stored in the Flash ROM 103 onto the RAM 102 and perform the processing of the image processing unit 111.

The audio input unit 120 collects the ambient sound and/or voice around the image pickup apparatus 100 through a built-in omnidirectional microphone, or an external microphone connected via an audio input terminal, or the like. After that, the audio input unit 120 converts the acquired analog audio signal into a digital audio signal, and temporarily stores the digital audio signal in the RAM 102. Thereafter, the digital audio signal stored in the RAM 102 is transmitted to the audio processing unit 121.

The audio processing unit 121 is a microcomputer in which a program for executing the following processing is installed. During a recording period, the audio processing unit 121 performs audio level adjustment processing and noise reduction processing for the digital audio signal stored in the RAM. 102, and restores the processed digital audio signal in the RAM 102.

In addition, the audio processing unit 121 performs compression processing of the digital audio signal as necessary. As for the audio data compression method, well-known typical audio data compression methods such as the Audio Code Number 3 (AC3) and the Advanced Audio Coding (AAC) are employed for the above compression processing. Descriptions thereof will be omitted as it is not related to features of the present exemplary embodiment.

Further, during a reproducing period, the audio processing unit 121 performs processing of decoding the compressed audio data, which is included in an audio file and a moving image file read out from the recording medium 140 by the recording/reproducing unit 141. Incidentally, the CPU 101 may perform the processing by the audio processing unit 121 by loading on the RAM 102 a program stored in the Flash ROM 103 and executing thereof to perform the above-mentioned processing.

The display control unit 131 is a microcomputer for performing display control of an image displayed on the display unit 130. The display control unit 131 reads out the digital image signal that is temporarily stored in the RAM 102, and displays the image on the display unit 130.

The display control unit 131 also performs processing of displaying, on the display unit 130, the image of the image data included in a moving image file and a still image file read out from the recording medium 140 by the recording/reproducing unit 141. The display unit 130 may be a liquid crystal panel or an organic electroluminescence (EL) panel mounted on the image pickup apparatus 100, or a display apparatus (e.g., a television set, a monitor, a projector), which is provided separately from the image pickup apparatus 100.

Further, the CPU 101 may perform the processing by the display control unit 131 by loading on the RAM. 102 a program stored in the Flash ROM 103 and executing thereof to perform the above-mentioned processing.

The coding/decoding processing unit 160 is a microcomputer in which a program for executing the following processing is installed. In the recording period, the coding/decoding processing unit 160 performs image compression processing based on the digital image signal processed and stored in the RAM 102 by the image processing unit 111, generates the compressed moving image data and the still image data, and temporality stores the compressed moving image data and the still image data in the RAM 102.

Further, in the reproducing period, the coding/decoding processing unit 160 performs processing of decoding the compressed moving image data and the still image data included in the image file read out from the recording medium 140, extracting the digital image signal, and storing the extracted digital image signal in the RAM 102. The CPU 101 may perform the above-described processing by loading on the RAM 102 a program stored in the Flash ROM 103 and executing thereof to perform the above-mentioned processing.

In the present exemplary embodiment, the coding/decoding processing unit 160 generates the moving image data by compressing the image data acquired by the image capture unit 110 according to MPEG-4 AVC/H.264. In MPEG-4 AVC/H.264, compression and coding of the input image data are executed by an intra-frame prediction coding method (intra-coding method) and a motion compensation forward prediction inter-frame coding method.

In addition, in MPEG-4 AVC/H.264, a certain frame is specified from among the frames encoded by the intra-frame prediction coding method, and a flag can be added to that specific frame. This flag inhibits the frame encoded by the motion compensation forward prediction inter-frame coding method from referring to preceding frames of the specified frame with the flag.

Accordingly, this specific frame serves as an IDR frame. The IDR frame has a function of providing an IDR picture identifier (idr_pic_id). As described in the known standard, MPEG-4 AVC/H.264 (ISO/IEC 14496-10), the IDR picture identifier (idr_pic_id) is stored in a slice header of a slice including a plurality of macro-blocks.

Next, the recording/reproducing unit 141 is a microcomputer in which a program for performing the following processing is installed. During a moving image recording period, the recording/reproducing unit 141 writes various kinds of data and information stored in the RAM 102 into the recording medium 140 as a moving image file. The various kinds of data and information include compressed moving image data generated by the coding/decoding processing unit 160, audio data generated by the audio processing unit 121, and various types of information such as a capturing date.

Further, during a still image recording period, the recording/reproducing unit 141 writes still image data and various types of information such as a capturing date, which are stored in the RAM 102, into the recording medium 140 as a still image file. When a moving image file is recorded onto the recording medium 140, the recording/reproducing unit 141 forms a data stream consisting of compressed moving image data and audio data. Thereafter, the recording/reproducing unit 141 records the data onto the recording medium 140 in a sequential manner as a moving image file conforming to the file format such as FAT and exFAT, by applying a file header thereto.

Further, during the reproducing period, the recording/reproducing unit 141 reads out the moving image file and the still image file recorded onto the recording medium 140 according to the above-described file format. The CPU 101 analyzes the file headers of the moving image file and the still image file which are read out from the recording medium 140, and extracts the compressed moving image data and the still image data, respectively.

The compressed moving image data and the still image data extracted therefrom are stored in the RAM. 102, and decoded by the coding/decoding processing unit 160. Incidentally, the CPU 101 may perform the processing performed by the recording/reproducing unit 141 by loading on the RAM 102 a program stored in the Flash ROM 103 and executing thereof to perform the above-mentioned processing.

Further, the recording medium 140 may be a recording medium built in the image pickup apparatus 100 or a removable recording medium. For example, the recording medium 140 includes various types of recording media such as a hard disk drive, an optical disk, a magneto-optical disk (MO), a compact disc-recordable (CD-R), a digital versatile disc-recordable (DVD-R), a magnetic tape, a non-volatile semiconductor memory, a flash memory. When the removable recording medium is used as the recording medium 140, the recording/reproducing unit 141 may include an interface for accepting such removable recording medium.

The audio output unit 132 may be a speaker, an audio output terminal (i.e., analog terminal, digital terminal), for example. In a case where the speaker serves as the audio output unit 132, the speaker converts the digital audio signal into an analog audio signal and outputs thereof externally as audio when the CPU 101 provides an instruction for outputting a certain digital audio signal stored in the Flash ROM 103.

In addition, the audio output unit 132 converts a digital audio signal corresponding to the audio data stored in the moving image file into the analog audio signal, and outputs thereof externally as audio. In a case where the audio output terminal serves as the audio output unit 132, the audio output terminal outputs the digital audio signal corresponding to the audio data stored in the moving image file to the external device such as an external speaker after converting the signal thereof into the analog audio signal, or simply outputs the digital audio signal as it is to the external device such as an audio system provided with an optical digital terminal.

The communication unit 150 exchanges various kinds of signals, files, and data with an external device other than the image pickup apparatus 100. A control signal, a moving image file, a still image file, and various kinds of data are exchanged between the communication unit 150 and the external device. The communication unit 150 and the external device can be communicated through a wired connection as well as a wireless connection, and any type of communication system can be employed thereto.

Herein, general operation of the image pickup apparatus 100 according to the present exemplary embodiment is described. In the image pickup apparatus 100 according to the present exemplary embodiment, when a user operates the power button on the operation unit 104, the operation unit 104 provides the CPU 101 with an instruction for starting. Upon receiving the instruction, the CPU 101 controls a power supply unit (not shown) so as to supply electric power to each block of the image pickup apparatus 100.

When power is supplied thereto, the CPU 101 checks the state of a mode selection switch on the operation unit 104 to confirm an operation mode that is selected from among "still image capturing mode", "moving image capturing mode", and "reproducing mode" based on the instruction signal from the operation unit 104.

In the image pickup apparatus 100 according to the present exemplary embodiment, in particular, an example of compressing the moving image data through a compression method according to MPEG-4 AVC/H.264 in the moving image capturing mode is described.

In the moving image capturing mode, the image pickup apparatus 100 according to the present exemplary embodiment includes a first compression mode and a second compression mode. In the first compression mode, compression coding is performed on all of the frames of the moving image data only using the IDR frames, whereas in the second mode, the compression coding is performed on the frames of the moving image data using either the intra-frame coding frames (I-frame, IDR frame) or the inter-frame coding frames (P-frame, B-frame). In addition, in the first compression mode, all of the frames are not necessarily be compressed as the IDR frames.

<Still Image Capturing Mode>

When the operation mode is a still image capturing mode, the CPU 101 causes each block of the image pickup apparatus 100 to prepare for the still image capturing. Until an instruction for starting the still image capturing is input from the operation unit 104, the CPU 101 causes the RAM 102 to store the digital image signal acquired by the image capture unit 110, and controls the display control unit 131 to read out the digital image signal stored in the RAM 102 to display the image on the display unit 130.

The CPU 101 may control the display control unit 131 to read out the digital image signal stored in the RAM 102 which is processed by the image processing unit 111, so that the image is displayed on the display unit 130. Further, in the present exemplary embodiment, a frame rate of the digital image signal output from the image capture unit 110 is set to be 30 frames/second. In addition, in the present exemplary embodiment, a size (number of pixels) of the still image to be recorded thereon can be set to a certain size selected from among a plurality of sizes.

In this state, the CPU 101 determines whether the instruction for starting the still image capturing is input by the operation unit 104. When the instruction for starting the still image capturing is input, the CPU 101 causes the RAM 102 to store the digital image signal acquired by the image capture unit 110, and controls the image processing unit 111 to perform image quality adjustment processing on the digital image signal stored in the RAM 102 based on the set value. Thereafter, the CPU 101 causes the RAM 102 to store the digital image signal processed by the image processing unit 111, and controls the coding/decoding processing unit 160 to encode the digital image signal stored in the RAM 102 to generate still image data.

Next, the CPU 101 causes the RAM 102 to store the still image data processed by the coding/decoding processing unit 160 again, and controls the recording/reproducing unit 141 to record the stored still image data onto the recording medium 140 as a still image file.

When the above processing is completed, the CPU 101 returns each block of the image pickup apparatus 100 to a ready state for the still image capturing.

<Moving Image Capturing Mode>

Next, when the operation mode is a moving image capturing mode, the CPU 101 determines whether the moving image capturing mode is in the above-described first compression mode or the second compression mode, and stores the determination result in the RAM 102. The CPU 101 causes each block of the image pickup apparatus 100 to prepare for the moving image capturing.

Until the instruction for starting the moving image capturing is input from the operation unit 104, the CPU 101 causes the RAM 102 to store the digital image signal acquired by the image capture unit 110, and controls the display control unit 131 to readout the digital image signal stored in the RAM 102 to display the image on the display unit 130. The CPU 101 may control the display control unit 131 to readout the digital image signal processed by the image processing unit 111 and stored in the RAM 102, so as to display the image on the display unit 130.

Further, in the present exemplary embodiment, a frame rate of the digital image signal output from the image capture unit 110 is set to be 30 frames/sec. In addition, in the present exemplary embodiment, a size (number of pixels) of the moving image to be recorded thereon can be set to a certain size selected from among a plurality of sizes.

In this state, the CPU 101 determines whether the instruction for starting the moving image capturing is input by the operation unit 104. When the instruction for starting the moving image capturing is input, the CPU 101 causes the RAM 102 to store the digital image signal acquired by the image capture unit 110, and controls the image processing unit 111 to perform image quality adjustment processing on the digital image signal stored in the RAM 102 based on the set value.

The CPU 101 causes the image processing unit 111 sequentially to process the digital image signal output from the image capture unit 110 at the frame rate of 30 frames/second, when the moving image is being captured. Thereafter, the CPU 101 causes the RAM 102 to sequentially store the digital image signal processed by the image processing unit 111.

Next, the CPU 101 controls the coding/decoding processing unit 160 to sequentially encode the digital image signal of the plurality of frames stored in the RAM 102, and to generate moving image data.

At this time, the CPU 101 controls the coding/decoding processing unit 160 to perform compression coding so as to encode each frame image as the IDR frame in the first compression mode, whereas in the second compression mode, each frame image is encoded as the intra-frame prediction coding frame or the inter-frame prediction coding frame. Thereafter, the CPU 101 causes the RAM 102 to store each frame image encoded by the coding/decoding processing unit 160 in a sequential manner.

When the instruction for starting the moving image capturing is input, the CPU 101 also controls each block of the image pickup apparatus 100 to perform processing relating to the audio. The CPU 101 causes the RAM 102 to store sequentially the digital audio signal output from the audio input unit 120, and controls the audio processing unit 121 to perform audio quality adjustment processing to the digital audio signal stored in the RAM 102.

Further, in a case where a setting for audio compression is made, the CPU 101 controls the audio processing unit 121 to compress the audio signal through an audio compression method such as AC3, AAC, or the like according to the setting. Thereafter, the CPU 101 causes the RAM 102 to store the audio data processed by the audio processing unit 121 in a sequential manner.

Next, the CPU 101 controls the recording/reproducing unit 141 to sequentially record the moving image data and the audio data stored in the RAM 102 onto the recording medium 140.

The CPU 101 controls the recording/reproducing unit 141 to form a data stream by combining 15 frames (0.5 seconds) of the moving image data with 0.5 seconds of audio data to make a pair while adding various types of necessary information thereto, for example, and to record the data onto the recording medium 140 according to the file system. Incidentally, 30 frames (1 second) of the moving image data and 1 second of audio data may be combined to make a pair. The CPU 101 continues the above-described operation until the instruction for ending the moving image capturing is input.

When the instruction for ending the moving image capturing is input by the operation unit 104, the CPU 101 causes the image processing unit 111 to stop the processing. The CPU 101 further causes the coding/decoding processing unit 160 to stop the coding processing at the point in time when the coding of the digital image signal stored in the RAM 102 is completed.

The CPU 101 controls the recording/reproducing unit 141 to stop the operation after the recording of the encoded moving image data and the audio data onto the recording medium 140 is completed to the end.

Further, as needed, after the recording is completed, thumbnail image data may be generated and recorded by associating the thumbnail image data with the corresponding moving image file. To generate the thumbnail image data, image data of a first frame or some frames after the first frame of the moving image data of the moving image file is transmitted to the coding/decoding processing unit 160 for decoding. Thereafter, pixels of that decoded digital image signal are thinned to generate the thumbnail image data.

When the above processing is completed, the CPU 101 returns each block of the image pickup apparatus 100 to a ready state for the moving image capturing.

<Reproducing Mode>

When the operation mode is a reproducing mode, the CPU 101 controls the recording/reproducing unit 141 to read out the thumbnail image data associated with the file that is specified from among the moving image files and the still image files, which are recorded on the recording medium 140. Thereafter, the CPU 101 controls the display control unit 131 to display the images corresponding to the thumbnail image data on the display unit 130.

When the instruction for reproducing the file corresponding to the specified thumbnail is input from the operation unit 104, the CPU 101 controls the recording/reproducing unit 141 to read out the specified moving image file or the still image file from the recording medium 140. Further, the CPU 101 extracts various types of information, moving image data, audio data, and still image data included in the moving image file and the still image file, which are read out from the recording medium 140, and causes the RAM 102 to store the extracted data.

In a case where the still image file is reproduced, the CPU 101 controls the coding/decoding processing unit 160 to decode the still image data stored in the RAM 102, and causes the RAM 102 to store the decoded digital image signal. Further, the CPU 101 controls the display control unit 131 to display the digital image signal decoded and stored in the RAM 102, on the display unit 130.

In addition, when the moving image file is reproduced, the CPU 101 controls the coding/decoding processing unit 160 to decode the moving image data stored in the RAM 102, and causes the RAM 102 to sequentially store the decoded digital image signal of each decoded frame.

The CPU 101 controls the display control unit 131 to sequentially display the digital image signal of each frame decoded and stored in the RAM 102, on the display unit 130. Further, the CPU 101 transmits the audio data stored in the RAM 102 to the audio output unit 132, and causes the audio output unit 132 to output that audio data in synchronization with the timing of decoding and displaying of the moving image data.

When the audio data is compressed data, the CPU 101 controls the audio processing unit 121 to decode the audio data stored in the RAM 102, so that the decoded audio data is transmitted to the audio output unit 132.

Next, "the first compression mode" and "the second compression mode" in the moving image capturing mode are described.

In the first compression mode, every frame of the captured moving image is compressed and encoded through a coding method using an intra-frame prediction (intra-prediction) according to MPEG-4 AVC/H.264, so that every frame is set to be the IDR frame.

In this manner, compressing each frame by the intra-frame prediction is advantageous in that a load of the decoder can be reduced because a reference frame does not have to be stored at the time of decoding, the decoding can be performed quickly, the decoding can be started from any of the frames, the editing can be performed with ease, and so on.

Further, in the second compression mode, each frame of the captured moving image is encoded and compressed by employing either the intra-prediction coding method or the motion compensation forward prediction inter-frame coding method according to MPEG-4 AVC/H.264.

In this manner, compressing the moving image by the inter-frame prediction coding method enables the coding volume to be reduced considerably, when compared to the case where the moving image data is compressed only by the intra-frame prediction coding method. According to the usage of the captured moving image, the user can select and set any one of these compression modes by operating the operation unit 104.

Herein, an intra-prediction coding frame is called as an I-frame, whereas the frame compressed by the forward prediction inter-frame compression method is called as a P-frame. Further, the IDR frame is an intra-frame prediction coding frame in which a flag is added thereon. This flag disables the inter-frame prediction coding frame from referring to a preceding frame of the IDR frame.

In the first compression mode, every captured moving image frame is encoded as the I-frame, and set as the IDR frame. On the other hand, in the second compression mode, one frame for every 15 frames is encoded as the I-frame, while the rest of the 14 frames are encoded as the P-frames. Further, in the second compression mode, the B-frame may be used. In the B-frame, any one of the forward prediction inter-frame compression method, the backward prediction inter-frame compression method, and the bi-direction prediction inter-frame compression method can be used in a selective manner.

In order to make the following description simple, the IDR frame identifier (idr_pic_id) that is set to the IDR frame is called as "IDRID".

Hereinafter, in the moving image capturing mode of the image pickup apparatus 100 according to the present exemplary embodiment, the operation to be performed when the still image is captured while the moving image is being captured is described with reference to FIGS. 2 through 5.

Incidentally, the coding/decoding processing unit 160 according to the present exemplary embodiment has a function of applying the IDRID to each IDR frame in the coded order (i.e., input order) while incrementing the number thereof.

In other words, when "0" is assigned as the IDRD for the first IDR frame of the moving image data, "1" is assigned to the next IDR frame, and "2" is assigned to the IDR frame following after the next IDR frame. In this manner, the number is sequentially incremented and assigned to each IDR frame. The maximum value of the IDRID is 65535, for example. Therefore, in a case where the IDRID is incremented and has reached the maximum value, the number returns to "0", and the IDRID is assigned in a sequential manner from "0" again.

In the first compression mode of the moving image capturing mode, when the instruction for starting the still image capturing is input while the moving image is being captured, the image pickup apparatus 100 according to the present exemplary embodiment temporarily suspends the image processing and the compression operation for the moving image signal, and performs the image processing and the compression operation for the still image signal. After that, the image pickup apparatus 100 interpolates the moving image frames for the period that is lost due to the image processing and the compression operation of the still image with interpolation frames.

At this time, in a case where a single frame is generated as the interpolation frame in order to perform the interpolation of the moving image frames only using that frame, the IDRIDs of the adjacent IDR frames are the same. Therefore, when interpolation frames are generated, the image pickup apparatus 100 according to the present exemplary embodiment causes the coding/decoding processing unit 160 to generate the interpolation frames corresponding to a plurality of (two or more) frames. As a result, a plurality of interpolation frames having different IDRIDs can be generated.

Thereafter, required number of the plurality of generated interpolation frames having different IDRIDs are recorded onto the recording medium 140 with the IDRIDs of the adjacent IDR frames being different from each other. This operation is controlled by the CPU 101.

In the second compression mode of the moving image capturing mode, when the still image is captured while the moving image is being captured, the image pickup apparatus 100 temporarily suspends the image processing and the compression operation for the moving image frames, and performs the image processing and the compression operation for the still image. Further, the image pickup apparatus 100 generates the interpolation frames, and interpolates the moving image frames for the period that is lost due to the image processing and the compression operation of the still image with the interpolation frames.

As for the interpolation frame, one of the interpolation frame images is compressed and encoded as the I-frame, the P-frame, or the B-frame, and the remaining interpolation frame images are set in such a manner that the entire macroblocks (may be partially different) within the frame are set as "skipped macroblocks". Further, one frame for every 15 frames is encoded as the I-frame. Therefore, there may be a case where a part of the interpolation frames is encoded as the I-frame.

<First Compression Mode>

First, the operation of the first compression mode of the moving image capturing mode is described.

Figure 2:
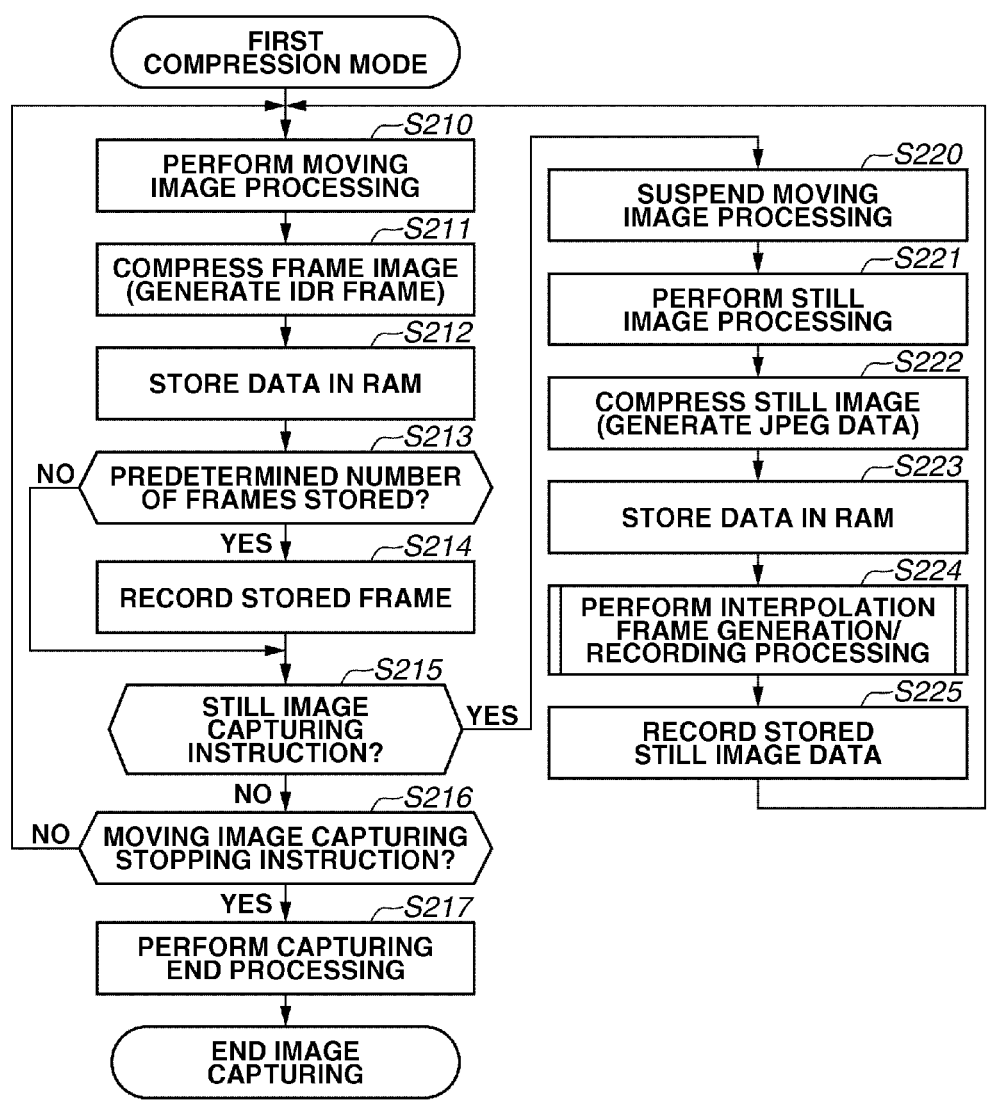
FIG. 2 is a flowchart illustrating processing performed during a moving image capturing mode.
Figure 3:
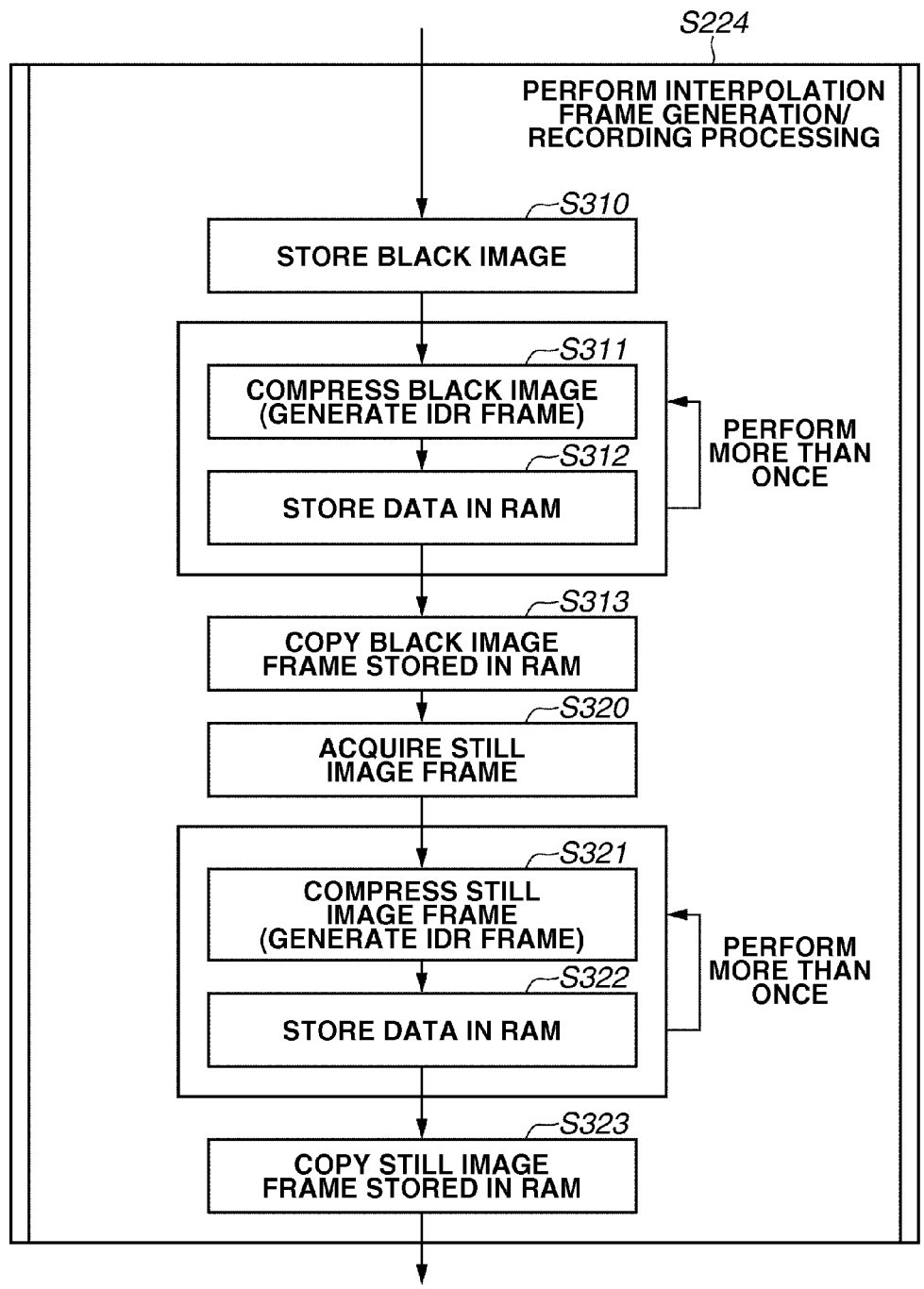
FIG. 3 is a flowchart illustrating interpolation generation processing performed during the moving image capturing mode.
Figure 4:
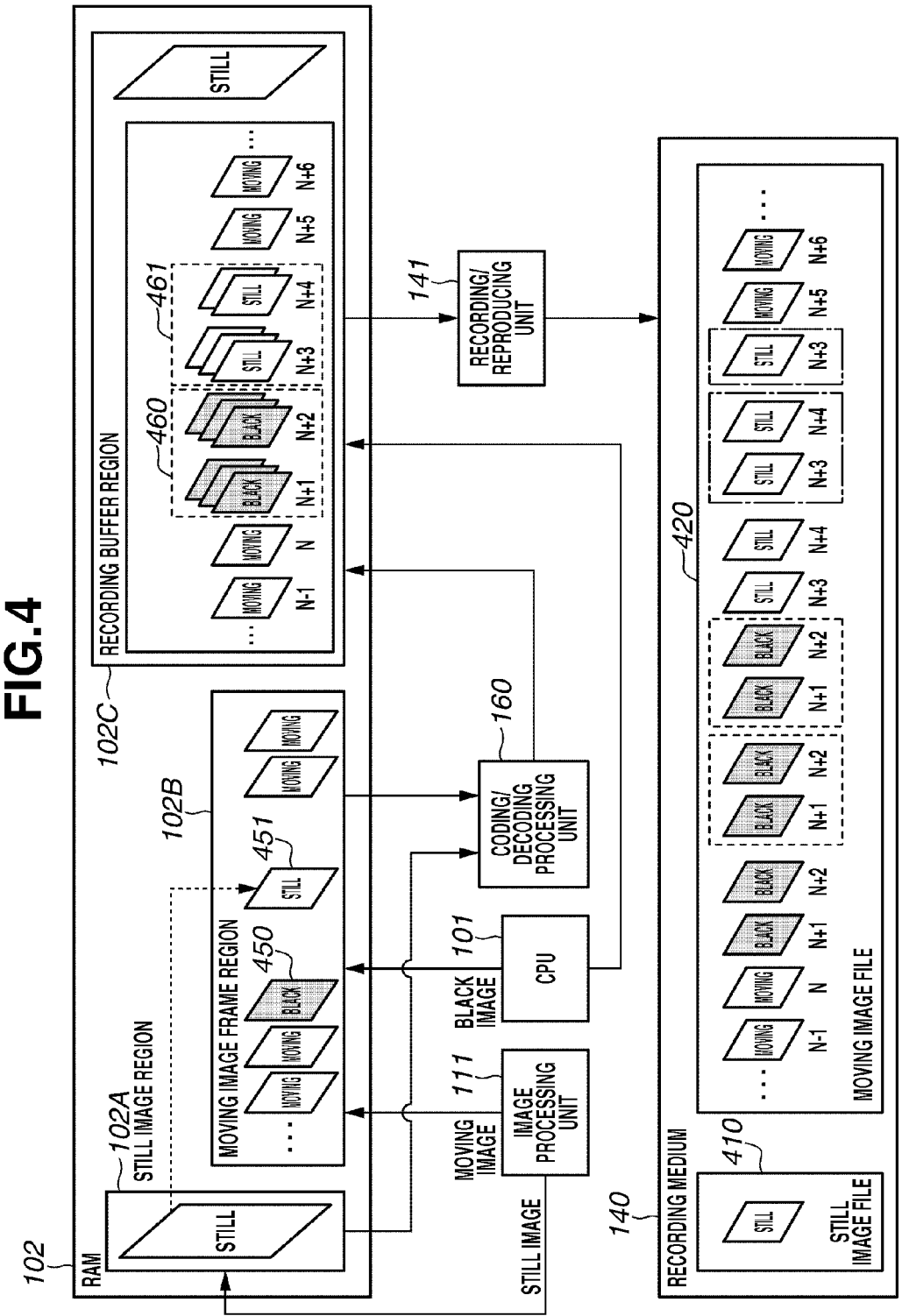
FIG. 4 is a block diagram illustrating a state of frames generated when a still image is captured while a moving image is being captured.
Figure 5:
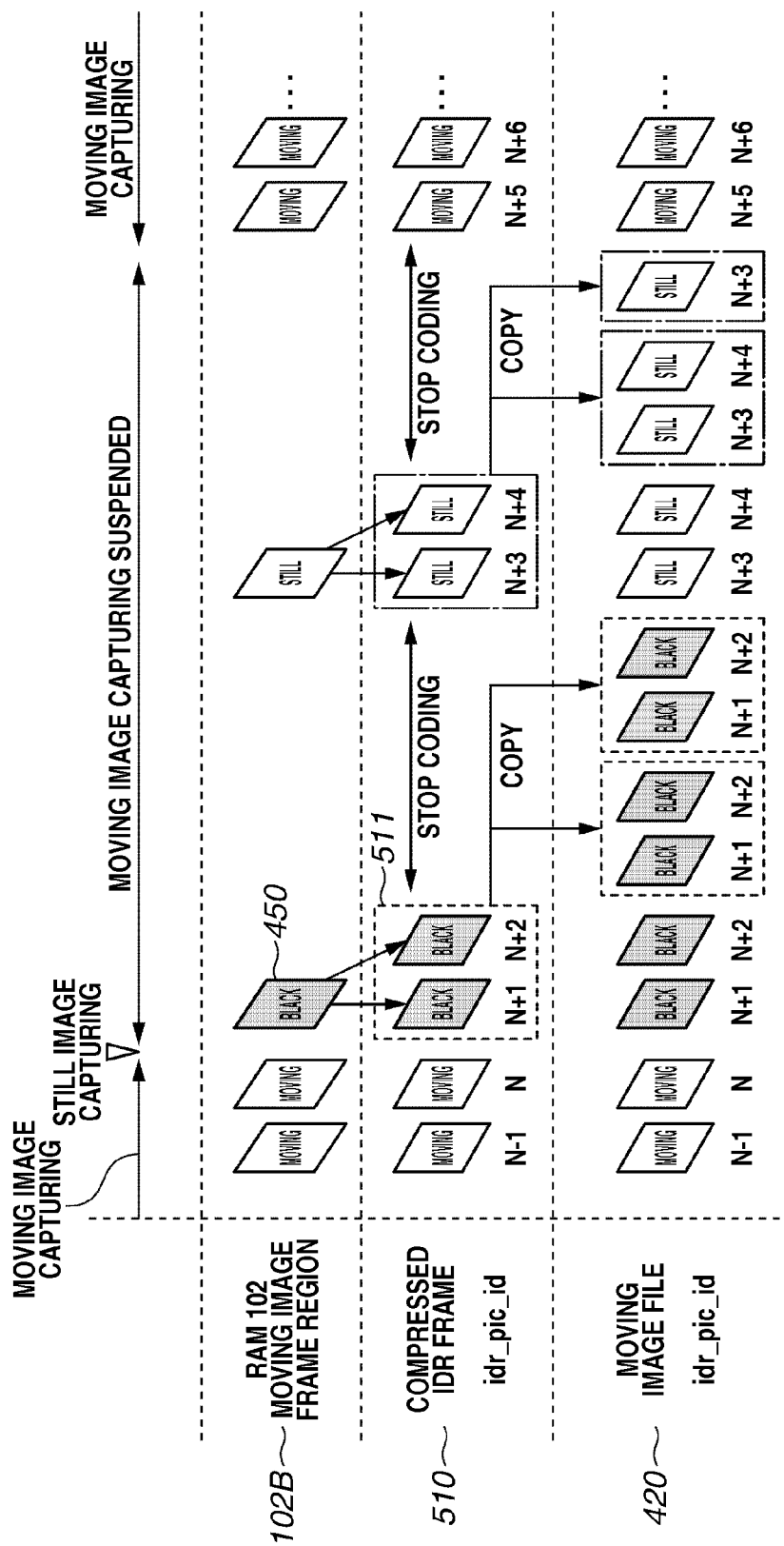
FIG. 5 is a block diagram illustrating a state of frames generated when a still image is captured while a moving image is being captured.

FIGS. 2 and 3 are flowcharts illustrating an operation from the start of the moving image recording until the completion of the moving image recording performed in the first compression mode of the image pickup apparatus 100 according to the present exemplary embodiment. The flowcharts in FIGS. 2 and 3 illustrate the operation executed by the CPU 101 controlling each block of the image pickup apparatus 100. FIGS. 4 and 5 are block diagrams illustrating a state of each frame image.

In step S210, when the instruction for starting the moving image capturing is input from the operation unit 104 in the first compression mode, the CPU 101 causes the image processing unit 111 to perform image processing of the digital image signal acquired by the image capture unit 110. The image processing thereof is performed according to the set value for the moving image capturing. After that, the CPU 101 causes the RAM 102 to temporarily store the processed digital image signal. Specifically, as illustrated in FIGS. 4 and 5, the CPU 101 stores the digital image signal in a moving image frame region 102B of the RAM 102.

In step S211, the CPU 101 reads out the digital image signal from the RAM 102. On the digital image signal, the image processing for the moving image capturing is performed. After that, the CPU 101 transmits the digital image signal to the coding/decoding processing unit 160, and causes the coding/decoding processing unit 160 to compress the digital image signal as the IDR frame.

As described above, the IDRID is assigned to the compressed IDR frame. When each frame image is compressed as the IDR frame, the incremented IDRID is assigned to each of the IDR frames. Accordingly, as illustrated in a compressed IDR frame image 510 of FIG. 5, the IDRID with incremented ID number is assigned sequentially to each of the IDR frame images compressed by the coding/decoding processing unit 160.

In step S212, the CPU 101 causes the RAM 102 to store the IDR frame image that is compressed by the coding/decoding processing unit 160. Accordingly, as illustrated in FIG. 4, a storage buffer region 102C of the RAM 102 stores the IDR frames having the assigned IDRIDs.

Next, in step S213, the CPU 101 determines whether a predetermined number of the compressed frame images are stored in the RAM 102. For example, the CPU 101 determines whether the 15 frames of the compressed frame images are stored. If the predetermined number of the compressed frame images are stored in the RAM 102 (YES in step S213), the processing proceeds to step S214. On the other hand, if the predetermined number of the compressed frame images are not stored in the RAM 102 (NO in step S213), the processing proceeds to step S215.

In step S214, if the predetermined number of the compressed frame images are stored in the RAM 102 (YES in step S213), the CPU 101 controls the recording/reproducing unit 141 to record the compressed frame images stored in the RAM 102 onto the recording medium 140 as moving image data of the moving image file.

In step S213, if the predetermined number of the frame images are not stored in the RAM 102 (NO in step S213), or if the processing performed in step S214 is completed, the processing proceeds to step S215. In step S215, the CPU 101 determines whether the instruction for the still image capturing is input from the operation unit 104.

The instruction for the still image capturing is input by fully pressing a shutter button of the operation unit 104 of the image pickup apparatus 100. When the instruction for capturing the still image is input (YES in step S215), the processing proceeds to step S220. On the other hand, when the instruction for capturing the still image is not input (NO in step S215), the processing proceeds to step S216. In a case where the operation of pressing the shutter button is performed halfway, the CPU 101 controls the image capture unit 110 to perform auto-focusing but not perform the still image capturing.

In step S215, when the instruction for the still image capturing is not input (No in step S215), then in step S216, the CPU 101 determines whether the instruction for stopping the moving image capturing is input from the operation unit 104. In a case where the instruction for stopping the moving image capturing is input (YES in step S216), the processing proceeds to step S217. On the other hand, in a case where the instruction for stopping the moving image capturing is not input (No in step S216), the processing returns to step S210.

When the instruction for stopping the moving image capturing is input (YES in step S216), in step S217, the CPU 101 controls each block of the image pickup apparatus 100 in a following manner to perform the moving image capturing ending processing. The CPU 101 controls the image capture unit 110 to stop the image capturing operation, and controls the image processing unit 111 to stop the image processing.

When the coding/decoding processing unit 160 completes the compression of the digital image signal stored in the RAM 102, the CPU 101 causes the coding/decoding processing unit 160 to stop the compression operation. Thereafter, the CPU 101 controls the recording/reproducing unit 141 to record the compressed frame images stored in the RAM 102 onto the recording medium 140 as moving image data of the moving image file.

Further, the CPU 101 controls the recording/reproducing unit 141 to generate various types of information to be stored in a file header of the moving image file, and to record the generated information onto the recording medium 140 as a file header of the moving image file.

On the other hand, if the instruction for starting the still image capturing is input (YES in step S215), in step S220, the CPU 101 controls the image processing unit 111 to suspend the image processing for the moving image. As a result, images for the moving image are not output from the image processing unit 111, and therefore, the CPU 101 controls the coding/decoding processing unit 160 to suspend the moving image data compression operation.

Next, in step S221, the CPU 101 causes the image processing unit 111 to perform the image processing of the digital image signal acquired by the image capture unit 110. The image processing thereof is performed according to the set value for the still image capturing. After that, the CPU 101 causes the RAM 102 to temporarily store the processed digital image signal. In other words, as illustrated in FIG. 4, the processed digital image signal is stored in a still image region 102A of the RAM 102.

Next, in step S222, the CPU 101 reads out the digital image signal from the RAM 102. On the digital image signal, the image processing for the still image capturing is performed. The CPU 101 then transmits the digital image signal to the coding/decoding processing unit 160, and causes the coding/decoding processing unit 160 to compress the image data using the JPEG method.

In step S223, the CPU 101 causes the RAM 102 to store the compressed still image data. More specifically, as illustrated in FIG. 4, the CPU 101 causes the RAM 102 to store the still image data while distinguishing the still image data as different from the compressed IDR frames for the moving images which are stored in the recording buffer region 102C of the RAM 102.

In step S224, the CPU 101 performs processing for generating the interpolation frames for interpolating the moving image frames that are lost due to suspension of the image processing for the moving image. Description thereof will be given separately in detail with reference to FIGS. 3 through 5.

In step S225, when generation of the interpolation frame image is completed, the CPU 101 controls the recording/reproducing unit 141 to cause the still image data stored in the RAM 102 to be recorded onto the recording medium 140 as a still image data of the still image file.

After completion of the processing, the CPU 101 returns the processing to step S210, and restarts the processing of moving image frames and compression of the moving image frames. That is, as illustrated in FIG. 4, the CPU 101 controls the recording/reproducing unit 141 to cause the still image data that is temporarily stored in the RAM 102 to be recorded onto the recording medium 140 as a still image data of a still image file 410.

The CPU 101 performs the processing of step S217, and ends the image capturing when the remaining recording capacity of the recording medium 140 becomes insufficient (when the amount of the remaining recording capacity is lower than a predetermined amount), and when the moving image capturing is carried out for a certain period of time longer than a predetermined image capturing period).

Subsequently, processing performed in step S224, that is, the processing for generating the interpolation frames for interpolating the frames that are lost due to suspension of the image processing of the moving image, is described with reference to FIGS. 3 through 5.

First, in step S310, the CPU 101 reads out a black image from the Flash ROM 103, and stores the black image in the RAM 102. At this moment, the CPU 101 causes the RAM 102 to store the black image so as to be compressed by the coding/decoding processing unit 160 after the frame image of the moving image captured just before the input of the still image capturing instruction is compressed.

That is, as illustrated in FIGS. 4 and 5, a black image 450 is stored in the moving image frame region 102B of the RAM 102, next to the frame image of the moving image captured just before the input of the still image capturing instruction.

Next, in step S311, the CPU 101 reads out the black image stored in the RAM 102, transmits the black image to the coding/decoding processing unit 160, and causes the coding/decoding processing unit 160 to compress the black image as the IDR frame.

In step S312, the CPU 101 causes the RAM 102 to store the IDR frame image of the black image that is compressed by the coding/decoding processing unit 160.

In the present exemplary embodiment, the CPU 101 repeats the processing of steps S311 and S312 for a plurality of times (more than once). The coding/decoding processing unit 160 increments the IDRID and assigns the incremented IDRID to the IDR frame each time the image is compressed as the IDR frame. Therefore, repeating the processing of steps S311 and S312 for a plurality of times enables the coding/decoding processing unit 160 to assign a different IDRID to each of the IDR frames of the black image compressed by the coding/decoding processing unit 160.

Accordingly, as illustrated in compressed IDR frames 510 in FIG. 5, a plurality of compressed black image IDR frames 511 is generated by the coding/decoding processing unit 160. This enables different IDRIDs to be assigned to the respective IDR frames.

In the present exemplary embodiment, when "N" is assigned as the IDRID for the IDR frame immediately before the input of the still image capturing instruction, "N+1" and "N+2" are respectively assigned as the IDRIDs of the compressed IDR frames of the black image generated through the processing performed in steps S311 and S312.

In step S313, the CPU 101 repeats the processing of steps S311 and S312 for a plurality of times (more than once), and generates a predetermined number of copied frames by using the plurality of IDR frames of the black image stored in the RAM 102 for more than once.

Accordingly, as illustrated in FIG. 4, copies of the IDR frame 460 generated by copying the plurality of IDR frames of the black image are stored in the recording buffer region 102C. In the present exemplary embodiment, the plurality of IDR frames of the black image, respectively having the IDRIDs of "N+1" and "N+2", are used for a plurality of times to generate a predetermined number of copied frames.

Next, in step S320, the CPU 110 generates a copy of a digital image signal of the still image stored in the RAM 102 for a digital image signal of the moving image. This digital image signal of the still image is acquired by the image capture unit 110 according to the instruction of the still image capturing, undergone image processing performed by the image processing unit 111, and finally stored in the RAM 102.

In the present exemplary embodiment, a digital image signal of the moving image generated by copying from the digital image signal of the still image is called as "a still-image frame image". That is, as illustrated in FIG. 4, a copy is generated from the digital image signal of the still image stored in the still image region 102A of the RAM 102, and arranged in the moving image frame region 102B as a still-image frame image 451.

Next, in step S321, the CPU 101 reads out the still-image frame image stored in the RAM 102, transmits the still-image frame image to the coding/decoding processing unit 160, and causes the coding/decoding processing unit 160 to compress the still-image frame image as the IDR frame.

In step S322, the CPU 101 causes the RAM 102 to store the IDR frame image of the still-image frame image compressed by the coding/decoding processing unit 160.

In the present exemplary embodiment, the CPU 101 repeats the processing of steps S321 and S322 for a plurality of times (more than once). The coding/decoding processing unit 160 increments the IDRID and assigns the incremented IDRID each time the image is compressed as the IDR frame. Therefore, repeating the processing of steps S321 and S322 for a plurality of times enables the coding/decoding processing unit 160 to assign different IDRIDs to the IDR frames of the still-image frame image compressed by the coding/decoding processing unit 160.

In other words, as illustrated in the compressed IDR frames 510 of FIG. 5, the plurality of compressed IDR frames 511 of the still-image frame image is generated by the coding/decoding processing unit 160. This enables different IDRIDs to be assigned to the respective IDR frames.

In the present exemplary embodiment, "N+1" and "N+2" are respectively assigned as the IDRIDs of the compressed IDR frames of the black image. Therefore, "N+3" and "N+4" are respectively assigned as the IDRIDs of the compressed IDR frames of the still-image frame image generated through the processing of steps S321 and S322.

In step S323, the CPU 101 repeats the processing of steps S321 and S322 for a plurality of times (more than once). Subsequently, the CPU 101 uses the plurality of IDR frames of the still-image frame image stored in the RAM 102 for a plurality of times to generate a predetermined number of copies of the IDR frames of the still-image frame image.

The number of copies of the IDR frames of the black image generated through the processing in step S313 and the number of copies of the IDR frames of the still-image frame image generated through the processing in step S323 may or may not be the same. Accordingly, as illustrated in FIG. 4, copies of IDR frames 461 generated by copying the plurality of IDR frames of still-image frame image are stored in the recording buffer region 102C.

In the present exemplary embodiment, the plurality of IDR frames of the still-image frame image, respectively having the IDRIDs of "N+3" and "N+4", are used a plurality of times to generate a predetermined number of copies.

Further, in a case where the number of compressed frame images (IDR frames) stored in the RAM 102 becomes greater than a predetermined number when the processing is performed in step S224 (see, FIG. 3), the CPU 101 controls the recording/reproducing unit 141 to cause the compressed frame images stored in the RAM 102 to be recorded onto the recording medium 140 as moving image data of the moving image file. That is, the processing performed in steps S213 and S214 is performed.

Accordingly, in the first compression mode, the image pickup apparatus 100 according to the present exemplary embodiment performs the operation illustrated in the flowcharts of FIGS. 2 and 3 during a period from the start of the moving image recording until the end thereof. Though this, when missing frames of the moving image data are interpolated with the IDR frame images, the above-described processing enables the moving image data to be recorded onto the recording medium 140 so that the IDRIDs of the adjacent IDR frames become different.

That is, as illustrated in the moving image file 420 of FIGS. 4 and 5, "N" is assigned to the IDRID of the compressed moving image frame acquired just before the input of the still image capturing instruction. As for the interpolation frames, so that the IDRIDs of the adjacent IDR frames become different, the IDR frames of the black image respectively having "N+1" and "N+2" as the IDRIDs among IDR frames are arranged alternately when the IDR frames thereof are recorded onto the recording medium 140.

Likewise, in order to make the IDRIDs of the adjacent frames be different, the IDR frames of the still-image frame image respectively having "N+3" and "N+4" as the IDRIDs among IDR frames are arranged in an alternate manner when the IDR frames thereof are recorded onto the recording medium 140. Accordingly, the IDRID of the moving image frame after the interpolation frame becomes "N+5" because the IDRID of the compressed still-image frame image is "N+4".

Therefore, using the plurality of IDR frames generated by the coding processing performed more than once by the coding/decoding processing unit 160 enables the IDR frames to be recorded onto the recording medium 140 so that the IDRIDs of the adjacent IDR frames become different.

With the compression method having the limiting condition such as "different IDR frame identifiers (idr_pic_id) should be assigned to the IDR frames adjacent to each other", the image pickup apparatus 100 according to the present exemplary embodiment can generate the moving image data satisfying the limiting condition even if the still image is captured while the moving image is being captured.

In the present exemplary embodiment, the coding/decoding processing unit 160 having a function in which the IDRID of each IDR frame is assigned in the order of coding (i.e., order of inputting) while the value of the IDRID is incremented every time, is described. However, the CPU 101 according to the present exemplary embodiment may set the IDRID to the coding/decoding processing unit 160.

In this case, each time the coding/decoding unit 160 compresses the image corresponding to one frame as the IDR frame, the CPU 101 increments the number corresponding to the IDRID, and sets the incremented number to the coding/decoding processing unit 160. This enables the adjacent IDRIDs to be different because the IDRID of the incremented value is assigned each time when the coding/decoding processing unit 160 compresses the image corresponding to one frame as the IDR frame.

Further, in the present exemplary embodiment, the number of interpolation frames (i.e., a total number of the compressed IDR frames of the black image and the compressed IDR frames of the still-image frame image) can be any number. However, when the audio data is recorded for a period corresponding to the period of interpolation frames, a certain number of the interpolation frames corresponding to the actual time of the audio data are used.

When the missing frames generated in a period of 2 seconds are considered, for example, the number of the missing frames generated for the moving image with a frame rate of 30 frames/second is 60 frames. Therefore, when the interpolation frames are generated and recorded onto the recording medium 140, the interpolation frames are generated in such a manner that the sum of the numbers of IDR frames of the compressed black image and the IDR frames of the compressed still-image frame image becomes 60 frames.

Further, in the present exemplary embodiment, the black image and the image corresponding to the still image are used as the interpolation frames. However, images other than the above-mentioned images may be used as the interpolation frames. For example, only the black image or the image corresponding to the still image may be used, or other predetermined image may as well be used.

As a predetermined image, an image of a moving image acquired just before the input of the instruction for the still image capturing may be used, or a certain image that is recorded onto the Flash ROM 103 in advance may be used. That is, the interpolation frames can be generated based on any image.

When the interpolation frames are generated, the coding/decoding processing unit 160 compresses the image for the interpolation frames a plurality of times (more than once) and generates the interpolation frames having different IDRIDs. After that, by using the plurality of IDR frames having different IDRIDs generated by the coding processing performed more than once by the coding/decoding processing unit 160, the moving image data is interpolated in such a manner that the IDRIDs of the adjacent interpolation frames become different, and is recorded onto the recording medium 140.

Further, when the interpolation frames are generated, a coding/decoding processing unit 160 compresses the image for the interpolation frames a plurality of times (more than once), and generates the interpolation frames having different IDRIDs. However, the image for the interpolation frames may be prepared individually.

More specifically, the plurality of black images is arranged individually in the moving image frame region 102B of the RAM 102. Thereafter, the coding/decoding processing unit 160 respectively compresses these black images as the IDR frames to generate the interpolation frames having different IDRIDs.

In the present exemplary embodiment, the first compression mode in which all of the frames of the captured moving image are compressed as the IDR frames, is described. However, all of the frames of the captured moving image are not necessarily compressed as the IDR frames. That is, the frames for a period other than the period of the missing frames may not necessarily be compressed as the IDR frames. In other words, the frames compressed as the I-frames, the P-frames, and the B-frames may be used for normal frames of the moving image, and the interpolation frames may be compressed as the IDR frames.

<Second Compression Mode>

Next, the operation of the second compression mode of the moving image capturing mode is described. Referring to FIG. 2, a difference of an operation of the second compression mode from the operation of the first compression mode, will be described.

As described above, in the second compression mode, each frame of the captured moving image is encoded and compressed by using the intra-prediction coding method or the motion compensation forward prediction inter-frame coding method according to MPEG-4 AVC/H.264. Further, one frame for every 15 frames is encoded as the I-frame, while the rest of the 14 frames are encoded as the P-frames.

In step S211, in the first compression mode, the CPU 101 reads out the digital image signal on which the image processing for the moving image capturing is performed from the RAM 102, transmits the digital image signal to the coding/decoding processing unit 160, and causes the coding/decoding processing unit 160 to compress the digital image signal as the IDR frame.

However, in the second compression mode, each frame of the captured moving image is encoded and compressed by using the intra-prediction coding method or the motion compensation forward prediction inter-frame coding method according to MPEG-4 AVC/H.264.

In step S224, in the first compression mode, the CPU 101 performs the processing for generating the interpolation frames for interpolating the frames that are lost due to suspension of the image processing for the moving image.

In particular, as described referring to FIGS. 3 through 5, the interpolation frames are compressed as the IDR frames.

However, in the second compression mode, the CPU 101 encodes and compresses one of the interpolation frame images as the I-frame, the P-frame, or the B-frame, and as the remaining interpolation frame images, the entire macroblocks (can be partially different) within the frames are set to "skipped macroblocks".

Further, one frame for every 15 frames is encoded as the I-frame. Therefore, there may be a case where a part of the interpolation frames is encoded as the I-frame.

As in the same manner as the first compression mode, the images of the interpolation frames are generated using the black image and the still-image frame image.

Accordingly, in the second compression mode, the image pickup apparatus 100 according to the present exemplary embodiment is capable of interpolating the moving image frames without using the IDR frames as the interpolation frames.

In the first compression mode, the image pickup apparatus 100 according to the present exemplary embodiment interpolates the missing frames of the moving image with the frames compressed as the IDR frames. However, in the second compression mode, the image pickup apparatus 100 is capable of interpolating the missing frames of the moving image without using the frames compressed as the IDR frames.

Herein, a detailed configuration of the coding/decoding processing unit 160 according to the present exemplary embodiment is described.

FIG. 6 is a block diagram illustrating blocks for coding processing in the coding/decoding processing unit 160. In FIG. 6, a digital image signal of the moving image read out from the RAM 102 is input in each macroblock consisting of a predetermined number of pixels arranged in the horizontal and vertical directions, and is output to a calculation unit 601, an intra-frame prediction unit 608, and a motion prediction unit 611.

The calculation unit 601 calculates a difference between the predicted image data output from a switching unit 613 and the input image data. After that, the calculation unit 601 outputs the difference to an integer transform unit 602. The integer transform unit 602 performs integer transform processing, which is a type of an orthogonal transform processing, with respect to the input data from the calculation unit 601. The integer transform unit 602 further transforms the input data from a space component to a frequency component, and, outputs to a quantization processing unit 603.

The quantization processing unit 603 quantizes a transform coefficient of each macroblock according to a quantization table supplied from a quantization table selection unit (not illustrated), and outputs the quantized data to an entropy-coding unit 604 and an inverse quantization unit 605.

In the present exemplary embodiment, a plurality of quantization tables is prepared and held by the quantization table selection unit (not illustrated). In each of the quantization tables, a quantization width (quantization step) with respect to each transform coefficient of the macroblock is assigned. As described below, a value "Q" of the data compression degree is provided from the CPU 101, and the quantization table selection unit (not illustrated) selects a quantization table corresponding to the value thereof, and sends the quantization table to the quantization unit 603.

The inverse quantization unit 605 performs inverse quantization on the input data, and outputs thereof to an inverse integer transform unit 606. The inverse integer transform unit 606 performs inverse integer transform processing with respect to the data from the inverse quantization unit 605, transforms the data back to the original data in space component, and outputs thereof to a calculation unit 607. The calculation unit 607 adds the predicted image data output from the switching unit 613 to the data subjected to the inverse integer transform processing, and outputs the data to the intra-frame prediction unit 608 and a loop filter 609.

The loop filter 609 performs designated filter processing on the locally-decoded data from the calculation unit 607, and stores the data into a storage unit 610. The storage unit 610 stores the image data from the loop filter 609.

When the P-frame is processed in the second compression mode, the motion prediction unit 611 detects, from among the image data of the reference frames stored in the storage unit 610, a macroblock having a smallest prediction error (difference) with the input image data. Thereafter, the motion prediction unit 611 informs a motion compensation unit 612 of a motion vector for the detected macroblock.

According to the motion vector, the motion compensation unit 612 reads out macroblock data of the predicted image data from the storage unit 610, and outputs the macroblock data to the switching unit 613.

On the other hand, the intra-frame prediction unit 608 performs the intra-frame prediction processing when the I-frames and the IDR frames are processed in the first compression mode or the second compression mode. More specifically, the intra-frame prediction unit 608 detects the optimum intra-prediction mode, based on the data of a pixel that adjacent to the macroblock of the image data input from the calculation unit 607 on the upper side or the left side in the screen, and the input image data.

Further, the intra-frame prediction unit 608 outputs the predicted image data to the switching unit 613. This predicted image data is necessary for the processing to be performed in the detected intra-prediction mode. In MPEG-4 AVC/H.264, a predetermined number of different intra-prediction modes are available. The intra-frame prediction unit 608 detects the intra-prediction mode having the smallest prediction error from among the intra-prediction modes.

According to the instruction from the CPU 101, the switching unit 613 selects either one of the predicted image data output from the intra-frame prediction unit 608 or from the motion compensation unit 612, and outputs thereof to the calculation units 601 and 607. In the first compression mode, the switching unit 613 consistently compresses the image as the IDR frame when the moving image is being captured. Therefore, the switching unit 613 consistently selects and outputs the predicted image data output from the intra-frame prediction unit 608.

Further, in the second compression mode, the switching unit 613 selects the predicted image data output from the intra-frame prediction unit 608 to process the I-frame, and selects the predicted image data output from the motion compensation unit 612 to process the P-frame.

Information of the intra-prediction mode detected by the intra-frame prediction unit 608 and data of the motion vector detected by the motion prediction unit 611 are output to the entropy-coding unit 604. The entropy-coding unit 604 encodes the data from the quantization processing unit 603, a table number of the quantization table selected by the quantization table selection unit (not illustrated), the information of the intra-prediction mode, and the data of the motion vector. After that, the entropy-coding unit 604 outputs the encoded data as the compressed moving image data. At the same time, the entropy-coding unit 604 assigns the IDRID to a slice header of a slice consisting of a group of macroblocks.

According to the present exemplary embodiment, the image pickup apparatus 100 may be any apparatus such as a digital camera, a mobile phone, a smartphone, or the like, which is capable of capturing a still image while a moving image is being captured.

Next, the image pickup apparatus 100 according to a second exemplary embodiment is described. In the first exemplary embodiment, when the image of the interpolation frame is compressed in the first compression mode, the coding/decoding processing unit 160 compresses the black image and the still-image frame image a plurality of times, respectively. With this, the coding/decoding processing unit 160 generates a plurality of IDR frames of the compressed black image and the still-image frame image having different IDRIDs, and uses such IDR frames so that the IDRIDs of the adjacent IDR frames become different.

On the other hand, in the present exemplary embodiment, when the image of the interpolation frame is compressed in the first compression mode, the coding/decoding processing unit 160 does not compress the black image and the still-image frame image a plurality of times. Instead, copies of the IDR frames of the black image and the still-image frame image compressed by the coding/decoding processing unit 160 are generated in the RAM 102.

At this time, copies of the IDR frames whose IDRIDs stored in the slice headers of respective IDR frames are changed, are generated in the RAM 102. Accordingly, the IDRIDs of the adjacent IDR frames become different by using the copied IDR frames, in the same manner as in the first exemplary embodiment.

The configuration of the image pickup apparatus 100 according to the present exemplary embodiment is the same as that in the first exemplary embodiment. Therefore, descriptions thereof will be omitted. In addition, basic operations performed in the first compression mode and the second compression mode are also similar to those in the first exemplary embodiment, and thus descriptions thereof will be omitted.

The processing performed in step S224 in the first compression mode (the processing illustrated in the flowchart of FIG. 3) of the present exemplary embodiment is described because it is different from that in the first embodiment.

FIG. 7 is a flowchart illustrating processing for generating the interpolation frames for interpolating the moving image frames that are lost due to suspension of the image processing for the moving image, performed in step S224. Similar to the first exemplary embodiment, the flow chart of FIG. 7 illustrates an operation executed by the CPU 101 controlling each block of the image pickup apparatus 100.

First, in step S710, the CPU 101 reads out a black image from the Flash ROM 103, and stores thereof into the RAM 102. At this moment, the CPU 101 causes the RAM 102 to store the black image so that the black image is compressed by the coding/decoding processing unit 160 after the frame image of the moving image captured just before the input of the instruction for the still image capturing.

Next, in step S711, the CPU 101 reads out the black image stored in the RAM 102, transmits the read black image to the coding/decoding processing unit 160, and causes the coding/decoding processing unit 160 to compress the black image as the IDR frame.

Further, in step S712, the CPU 101 causes the RAM 102 to store the IDR frame image of the black image compressed by the coding/decoding processing unit 160.

Different from the processing performed in the first exemplary embodiment, in the present exemplary embodiment, the CPU 101 does not repeat the processing of steps S711 and S712 a plurality of times (more than once).

Next, in step S713, the CPU 101 generates a copy of the IDR frame of the compressed black image stored in the RAM 102. At this time, if the IDRID of the IDR frame just before the input of the still image capturing instruction is "N", the IDRID of the IDR frame of the compressed black image stored in the RAM 101 is "N+1". Therefore, the CPU 101 changes the IDRID of the copied IDR frame of the black image into a number other than "N+1". For example, the IDRID may be changed to "N+2" or "N".

Thereafter, in step S714, the CPU 101 generates a predetermined number of copies of the IDR frame of the black image compressed in step S711, and the copies of the IDR frame of the black image copied in step S713.

Next, in step S720, the CPU 110 generates a copy of the digital image signal of the still image, stored in the RAM 102, which is acquired by the image capture unit 110 according to the instruction of the still image capturing, and subjected to the image processing by the image processing unit 111, and stored in the RAM 102, as a digital image signal of the moving image.

Next, in step S721, the CPU 101 reads out the still-image frame image stored in the RAM 102, transmits the read still-image frame image to the coding/decoding processing unit 160, and causes the coding/decoding processing unit 160 to compress the transmitted still-image frame image as the IDR frame.

Further, in step S722, the CPU 101 causes the RAM 102 to store the IDR frame image of the still-image frame image compressed by the coding/decoding processing unit 160.

In the present exemplary embodiment, the CPU 101 does not repeat the processing of steps S721 and S722 a plurality of times (more than once).

Next, in step S723, the CPU 101 generates a copy of the IDR frame of the compressed still-image frame image stored in the RAM 102. At this time, in a same manner as in step S713, the CPU 101 changes the IDRID of the copied IDR frame of the still-image frame image to a number different from the IDRID of the IDR frame of the still-image frame image stored in the RAM 102. In a case where the IDRID of the IDR frame of the still-image frame image stored in the RAM 102 is "N+2", the IDRID of the copied IDR frame of the still-image frame image is changed to, for example, "N+1" or "N+3".

Further, in step S724, the CPU 101 generates a predetermined number of copies of the IDR frame of the still-image frame image compressed in step S721, and the copied IDR frame of the still-image frame image generated in step S723.

Performing the above-described operation enables the image pickup apparatus 100 according to the present exemplary embodiment to employ the compression method having the limiting condition such as "different IDR frame identifier (idr_pic_id) should be assigned to the IDR frames adjacent to each other" to generate the moving image data which satisfies such limiting condition even if the still image is captured while the moving image is being captured.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-192814 filed Sep. 5, 2011, which is hereby incorporated by reference herein in its entirety.

What is claimed is:

1. An image pickup apparatus comprising:
   an image capture unit, wherein the image capture unit performs an operation for obtaining moving image data and an operation for obtaining still image data;
   a compression unit that compresses the moving image data obtained by the image capture unit, wherein the compression unit compresses each of the plurality of frames of the moving image data as an IDR frame which has an identifier;
   a recording unit that records the moving image data compressed by the compression unit on a recording medium; and
   a control unit that controls the image capture unit, in accordance with a still image capture instruction while the moving image data is being recorded, to perform the operation for obtaining the still image data;
   wherein the control unit controls, in accordance with the still image capture instruction while the moving image data is being recorded, the compression unit to compress predetermined image data as the IDR frame more than once, and controls the recording unit to record a plurality of frames of the compressed predetermined image data acquired by compressing the predetermined image data more than once so that the identifiers of adjacent frames have different values.

2. An image pickup apparatus according to claim 1, wherein the compression unit compresses the moving image data by using MPEG-4 AVC/H.264.

3. An image pickup apparatus according to claim 1, wherein the compression unit compresses the image data of the IDR frame by using intra-frame prediction coding.

4. An image pickup apparatus according to claim 1, wherein a flag is added to the IDR frame, the flag indicating that a frame encoded by an inter-frame prediction coding and displayed after the IDR frame, is not capable of referring to a frame displayed before the IDR frame.

5. An image pickup apparatus according to claim 1, wherein the compression unit increments the value of the identifier of the IDR frame every frame.

6. An image pickup apparatus according to claim 1, wherein the compression unit has a first mode and a second mode, the compression unit compresses each of the plurality of frames of the moving image data as the IDR frame in the first mode, and compresses the moving image data by using an intra-frame prediction coding and an inter-frame prediction coding in the second mode.

7. An image pickup apparatus according to claim 6, wherein the control unit controls the compression unit, in the second mode, to compress the plurality of frames of the moving image data as a skipped macro block in accordance with the still image capture instruction while the moving image is being recorded.

8. An image pickup apparatus according to claim 1, wherein the predetermined image data includes at least one of image data of a black image and image data relating to still image data obtained by the image capture unit in accordance with the still image capture instruction.

9. An image pickup apparatus according to claim 1, wherein the control unit controls the compression unit, in accordance with the still image capture instruction while the moving image data is being recorded, to compress the predetermined image data instead of the moving image data, and to compress the moving image data again after the compressed predetermined image data for a predetermined period is recorded.

10. An image pickup apparatus according to claim 1, wherein the control unit controls the compression unit to compress the still image data obtained by the image capture unit by a compression method for a still image and controls the recording unit to record the compressed still image data on the recording medium.

11. An image pickup apparatus according to claim 1, wherein the control unit controls the image capture unit to perform the operation for obtaining the moving image data after the still image data is obtained by the image capture unit in accordance with the still image capture instruction while the moving image data is being recorded.

12. An image pickup apparatus comprising:
    an image capture unit, wherein the image capture unit performs an operation for obtaining moving image data and an operation for obtaining still image data;
    a compression unit that compresses the moving image data obtained by the image capture unit, wherein the compression unit compresses each of the plurality of frames of the moving image data as an IDR frame which has an identifier;
    a recording unit that records the moving image data compressed by the compression unit on a recording medium; and
    a control unit that controls the image capture unit, in accordance with a still image capture instruction while the moving image data is being recorded, to perform the operation for obtaining the still image data;
    wherein the control unit controls, in accordance with the still image capture instruction while the moving image data is being recorded, the compression unit to compress predetermined image data as the IDR frame,
    wherein the control unit generates a copy of the IDR frame corresponding to the predetermined image data compressed by the compression unit, and changes the identifier of the copied IDR frame; and
    wherein the control unit controls the recording unit to record a plurality of frames of the compressed predetermined image data so that the identifiers of adjacent frames have different values by using the IDR frame corresponding to the predetermined image data compressed by the compression unit and the copy of the IDR frame more than once.

13. An image pickup apparatus according to claim 12, wherein the compression unit increments the value of the identifier of the IDR frame every frame.

14. An image pickup apparatus according to claim 12, wherein the predetermined image data includes at least one of image data of a black image and image data relating to still image data obtained by the image capture unit in accordance with the still image capture instruction.

15. An image pickup apparatus comprising:
    an image capture unit, wherein the image capture unit performs an operation for obtaining moving image data and an operation for obtaining still image data;

a compression unit that compresses the moving image data obtained by the image capture unit according to a compression method using a first frame type and a second frame type, wherein an intra-frame predictive coding is used for the first frame type and an inter-frame predictive coding is used for the second frame type, the second frame type is inhibited from using a frame before the first frame type as a reference frame, the compression unit compresses each of the plurality of frames of the moving image data as the first frame type, and each of the plurality of frames of the moving image data compressed by the compression unit has an identifier;

a recording unit that records the moving image data compressed by the compression unit on a recording medium; and a control unit that controls the image capture unit, in accordance with a still image capture instruction while the moving image data is being recorded, to perform the operation for obtaining the still image data wherein the control unit controls, in accordance with the still image capture instruction while the moving image data is being recorded, the compression unit to compress predetermined image data as the first frame type more than once and controls the recording unit to record a plurality of frames of the compressed predetermined image data acquired by compressing the predetermined image data more than once so that the identifiers of adjacent frames have different values.

16. An image pickup apparatus according to claim 15, wherein the control unit controls the compression unit, in accordance with the still image capture instruction while the moving image data is being recorded, to compress the predetermined image data instead of the moving image data, and to compress the moving image data again after the compressed predetermined image data for a predetermined period is recorded.

17. An image pickup apparatus according to claim 15, wherein the control unit controls the compression unit to compress the still image data obtained by the image capture unit by a compression method for a still image and controls the recording unit to record the compressed still image data on the recording medium.

18. An image pickup apparatus according to claim 15, wherein the control unit controls the image capture unit to perform the operation for obtaining the moving image data after the still image data is obtained by the image capture unit in accordance with the still image capture instruction while the moving image data is being recorded.

19. An image pickup apparatus according to claim 15, wherein the predetermined image data includes at least one of image data of a black image and image data relating to still image data obtained by the image capture unit in accordance with the still image capture instruction.

* * * * *